FIG. 1
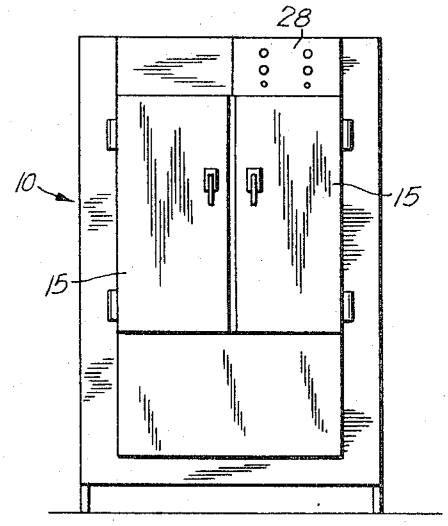
FIG. 2
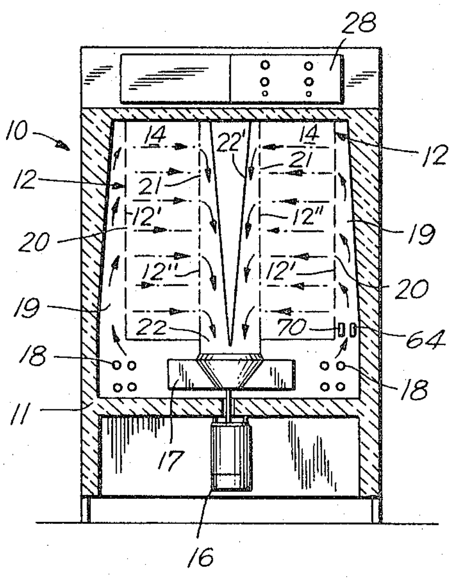
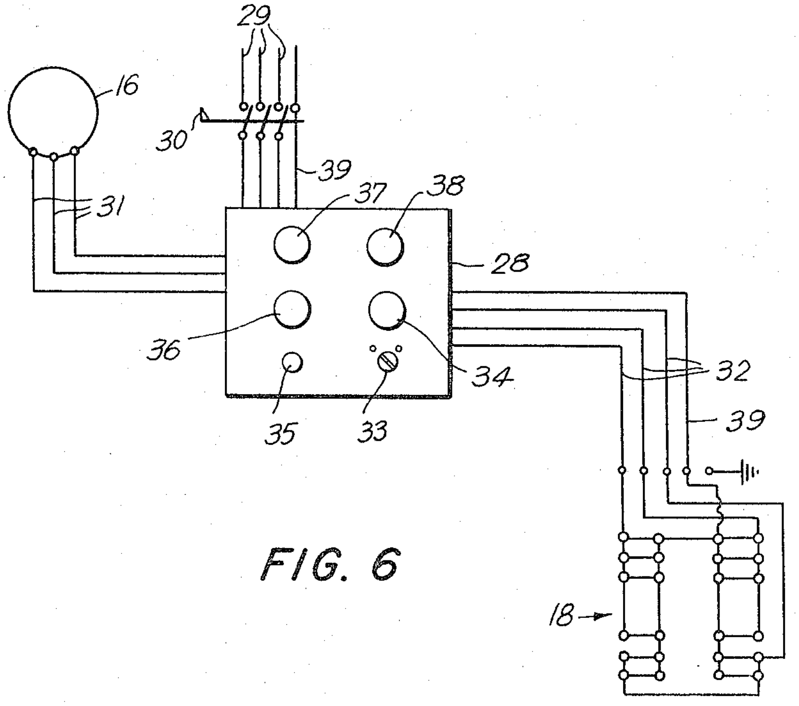
FIG. 6
Hans David Gramenius INVENTORS
Sture Ingemar Nilsson
ATTORNEY
Feb. 6, 1968  H. D. GRAMENIUS ET AL  3,368,062
APPARATUS FOR REGULATING A HEATING OVEN
TO CONTROL THAWING OF FROZEN FOOD
Filed June 12, 1964  4 Sheets-Sheet 1
INVENTORS
Hans David Gramenius
ATTORNEY INVENTORS
Hans David Gramenius
Sture Ingemar Nilsson their ATTORNEY Feb. 6, 1968 H. D. GRAMENIUS ET AL 3,368,062
APPARATUS FOR REGULATING A HEATING OVEN
TO CONTROL THAWING OF FROZEN FOOD
Filed June 12, 1964 4 Sheets-Sheet 2

INVENTORS
Ulf Venander

Feb. 6, 1968 H. D. GRAMENIUS ETAL 3,368,062

APPARATUS FOR REGULATING A HEATING OVEN
TO CONTROL THAWING OF FROZEN FOOD

Filed June 12, 1964 4 Sheets-Sheet 3

INVENTORS
Hans David Gramenius
Sture Ingemar Nilsson
their ATTORNEY

Feb. 6, 1968 H. D. GRAMENIUS ET AL 3,368,062

APPARATUS FOR REGULATING A HEATING OVEN TO CONTROL THAWING OF FROZEN FOOD

Filed June 12, 1964 4 Sheets-Sheet 4

INVENTORS
Hans David Gramenius
Styre Ingemar Nilsson
[signature]
their ATTORNEY 3,368,062

APPARATUS FOR REGULATING A HEATING OVEN TO CONTROL THAWING OF FROZEN FOOD

Hans David Gramenius and Sture Ingemar Nilsson, Alingsas, Sweden, assignors to Aktiebolaget Electrolux, Stockholm, Sweden, a corporation of Sweden Filed June 12, 1964, Ser. No. 374,664
Claims priority, application Sweden, June 13, 1963, 6,573/63
4 Claims. (Cl. 219—400)

ABSTRACT OF THE DISCLOSURE

Thawing and heating like portions of frozen food in a heating space by forcibly circulating therethrough a plurality of heated air streams which combine to form a single moving body of air with the air streams flowing at the same speed and only once past the frozen food portions, heating the air streams to preheat the space to a first high elevated temperature before inserting the frozen food portions therein to make the latter ready to receive the frozen food portions to be thawed and heated, and, after inserting the frozen food portions in the space, heating the air streams to a second lower elevated temperature to heat the food portions to a definite elevated temperature, and supplying to the space and storing therein during preheating a definite quantity of heat which will increase the temperatures of the frozen food portions in the space to 0° C. when the space is preheated to the first high elevated temperature and also effect thawing of the portions of frozen food substantially at 0° C.

This invention relates to apparatus for regulating a heating oven to control thawing and preparation of frozen food.

It has already been proposed to thaw and prepare frozen foods consecutively in a single operation by forced circulation of air heated to an elevated temperature or by radiation or by both forced air circulation and radiation. During thawing and preparing of frozen foods, it is important that the maximum elevated temperature to which the air is heated always is within a safe limit to avoid objectionable burning of the surface layers of food. This is particularly true during the latter part of a thawing period after the frozen food has been subjected to heating by heated air at an elevated temperature.

When the maximum safe temperature to which the air is heated is controlled by a conventional thermostat, it usually is too low when thawing of frozen food at a temperature of about −20° to −25° C. is started. When frozen food is initially heated to an elevated temperature of about 180° C., for example, which is within a safe limit during the latter part of a thawing period, heated air at such an elevated temperature is unduly low at the start of a thawing period. Even when the source of heat for heating the circulating air is thermostatically controlled to keep the heated air within the safe upper limit of about 180° C., for example, the source of heat is not capable of maintaining the circulating air at this temperature when the frozen food is initially introduced into a heating space, and the temperature of the heated air often will be reduced to about 140° C., for example, which is objectionable.

It is an object of this invention to provide an improved apparatus for regulating a heating oven to control thawing and preparation of frozen food by forced circulation of heated air. This is accomplished by heating the oven before frozen food is introduced therein to a first elevated readiness temperature which is higher than a second elevated temperature at which preparation of frozen food is continued after the food has been heated to a temperature of about 0° C. The heating space or spaces of an oven are heated by forced circulation of heated air to a readiness temperature which desirably is so selected that the quantity of heat supplied to and stored within the heating space or spaces of the oven, having due regard to the safe elevated temperature to which circulating air is heated in the latter stage of the food preparation, substantially corresponds to the quantity of heat which is equivalent to increasing the frozen food from a temperature below freezing to 0° C. and thawing it at this temperature. The heating effected by the heated air is supplemented by radiant heating from the walls of the heating spaces which are at a higher temperature than the heated circulating air.

If the safe maximum temperature to which circulating air is heated could be regulated so that it progressively decreases as the temperature of the frozen food gradually increases, the frozen food would be prepared for consumption under ideal conditions in the shortest possible interval of time. By heating air to an elevated temperature which is materially higher than the normal temperature to which the circulating air is heated in the latter part of the food preparation, the heating spaces are heated to a readiness temperature which speeds up the thawing and preparation of frozen food without any danger of burning the food and is a major step toward the thawing and preparation of frozen food under ideal conditions. This is especially important when a large number of frozen food portions or packages are thawed and prepared at the same time in schools, factories, and certain types of restaurants, for example.

Further objects and advantages of the invention will become apparent as the following description proceeds, and the various features of novelty which characterize the invention are pointed out with particularity in the claims annexed to and forming a part of this specification.

For a better understanding of the invention, reference may be had to the following description taken in connection with the accompanying drawing, in which:

FIG. 1 is a front elevation of a heating oven embodying the invention;

FIG. 2 is a front view, partly broken away and in section, of the heating oven shown in FIG. 1;

Figure 3:
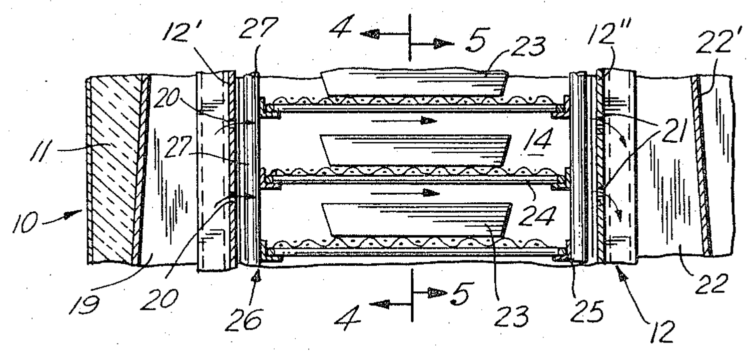
FIG. 3 is an enlarged fragmentary sectional view of the heating oven shown in FIG. 2 illustrating shelves for supporting frozen food portions thereon.
Figure 4:
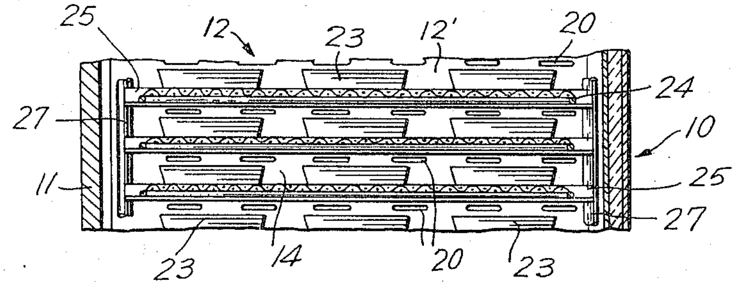
Figure 5:
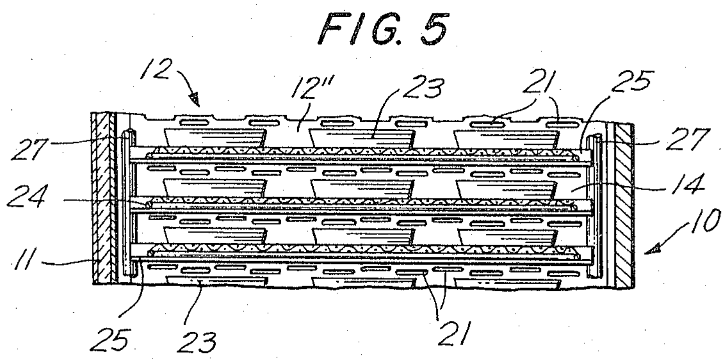
Figure 7:
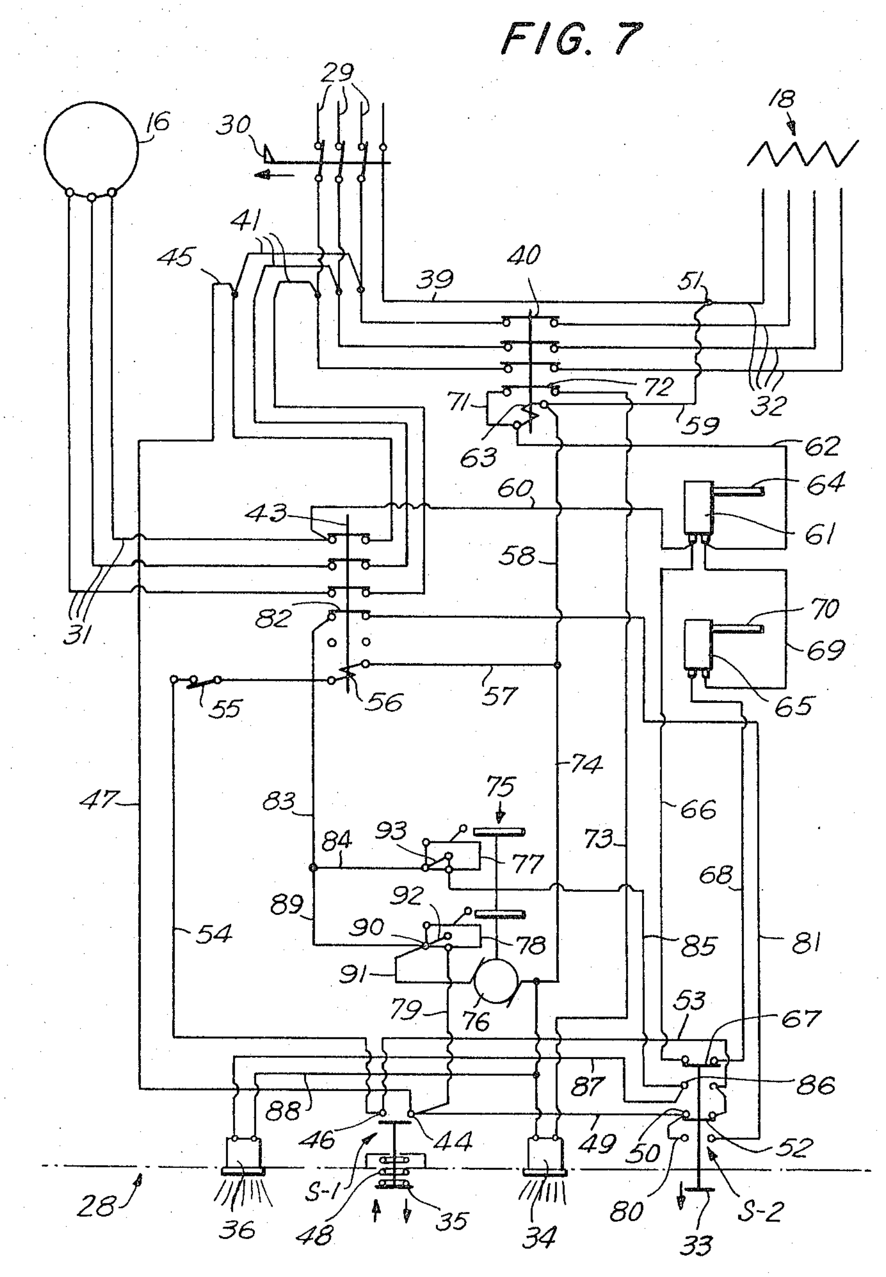
Figure 8:
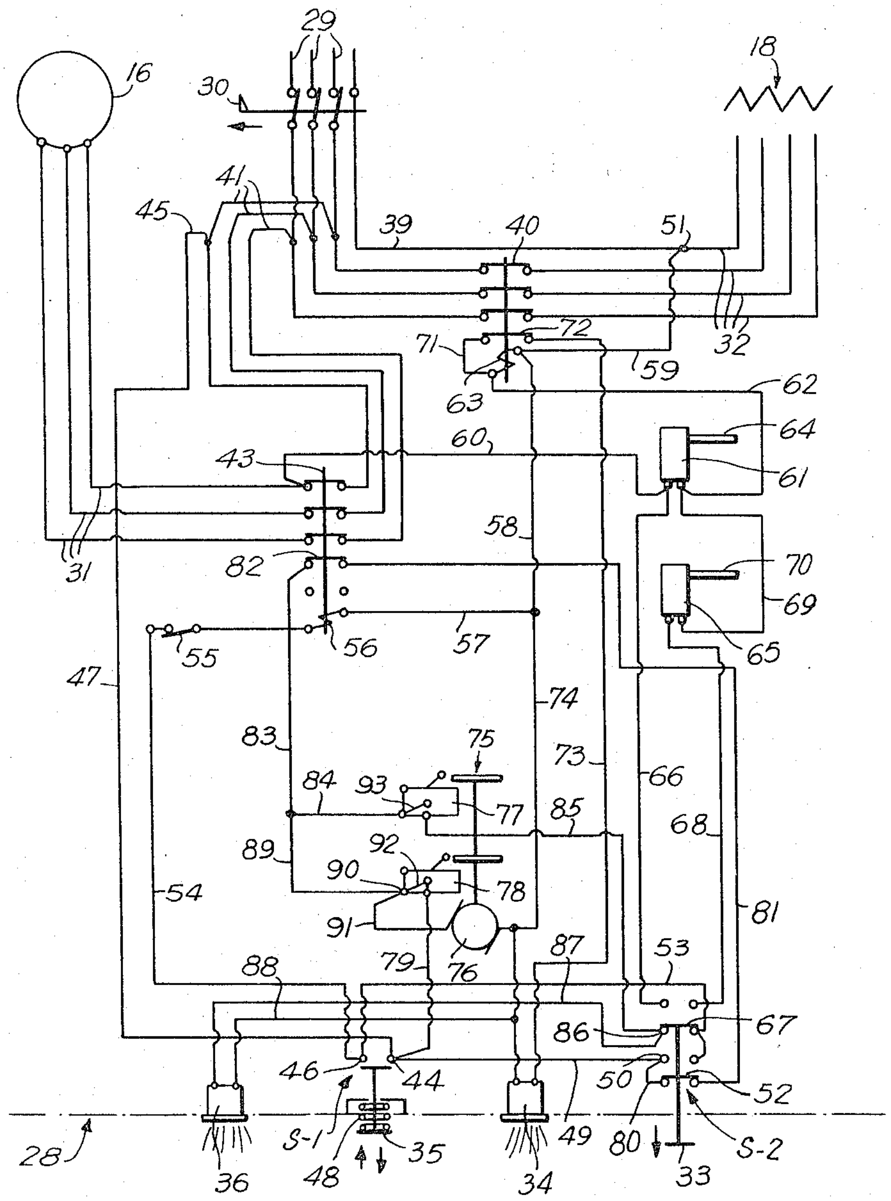

FIGS. 4 and 5 are sectional views taken at lines 4—4 and 5—5, respectively, of FIG. 3;

FIG. 6 diagrammatically represents an electric circuit for the heating oven shown in FIG. 2 and controls therefor;

FIG. 7 diagrammatically represents further details of the electric circuit shown in FIG. 6 operable to preheat the heating oven; and FIG. 8 is similar to FIG. 7 and diagrammatically represents the electric circuit operable to thaw frozen food portions in the heating oven.

Referring to FIGS. 1 to 5, the invention is shown in connection with a heating oven 10 provided with insulated walls 11 within which are disposed casings 12 defining heating spaces 14 having front access openings adapted to be closed by doors 15.

A motor 16 is arranged to drive a fan 17 for discharging air past heating elements 18. The heated air flows from the heating elements 18 into vertically extending air delivery channels 19. The outer walls 12' of the heating spaces 14 are provided with vertically spaced horizontal rows of elongated slots 20 which are in end-to-end relation for dividing the heated air in the air delivery channels 19 into a plurality of streams which pass through the heating spaces 14 in substantially parallel paths of flow. The opposite inner side walls 12'' of the heating spaces are provided with vertically spaced horizontal rows of staggered elongated slots 21 which are in end-to-end relation for discharging air exteriorly of the heating spaces 14.

The air discharged from the heating spaces 14 passes into vertically extending air discharge channels 22 which are formed by a V-shaped member 23 disposed between the inner side walls 12'' of the casings 12. The air collected in the air discharge channels 22 flows downward therein to the inlet of the fan 17 from which air is discharged past the heating elements 18.

The heating oven 10 is especially suitable for rapidly heating to a definite elevated temperature at one time a large number of frozen food portions 23. The frozen food portions or packages 23 are positioned on apertured shelves 24 which are formed of wire mesh or screening and removably supported one above another on L-shaped rails 25 at the sides of frame units 26 having vertical corner posts 27. After the frozen food portions 23 are positioned on the shelves 24 to provide three vertical stacks of the packages on each frame, for example, the doors 15 of the oven 10 may be opened and the frames 26 inserted into the heating spaces 14 in any suitable manner. The doors 15 can then be closed whereupon heating of all the frozen food portions 23 will commence at the same time.

The heated air flowing into the air delivery channels 19 is divided into a plurality of air streams at the slots 20 at the outer air inlet sides 12' of the heating spaces 14. The heated air forcibly flows at a sufficiently high velocity to the heating spaces for all of the air streams to flow contiguous to and in physical contact with one another and horizontally one above another from the air inlet sides 12' to the air outlet sides 12'' and discharge from the heating spaces through the slots 21 at the air outlet sides. The air delivery channels 19 function to distribute the heated air at the slotted air inlet sides 12' in such manner that each distributed part of the heated air is introduced into the heating spaces 14 at the slots 20 at an inlet pressure to cause all of the air streams to flow substantially at the same speed across the heating spaces from the air inlet sides to the opposite air outlet sides thereof. Essentially, the air streams collectively will form a single continuously moving body of heated air in each of the heating spaces 14 with successive portions thereof passing only once past the frozen food portions from the air inlet side to the air outlet side for discharge from each heating space with each air stream only flowing past those food portions 23 in its particular path of flow.

The control members for regulating the operation of the heating oven 10 are mounted on a panel 28 provided at the front of the oven above the doors 15, as diagrammatically illustrated in FIGS. 1 and 2. As shown in FIG. 6, electrical energy is supplied to the heating oven 10 from a suitable three-phase alternating current source of electrical supply through conductors 29 in which a main control switch 30 is connected. As will be described presently, current from the source of electrical supply is conducted through conductors 31 to the fan motor 16 and through conductors 32 to the electrical heating elements 18.

The panel 28 is provided with a switch operating member 33 to render the heating elements 18 operable to preheat the oven 10 and a pilot lamp 34 which is energized when the heating elements 18 are functioning during preheating of the oven. The panel 28 also is provided with a switch operating member 35 to render the heating elements 18 operable to heat the oven 10 when thawing of frozen food portions is desired and a pilot lamp 36 which is energized when the heating elements 18 are functioning when thawing of frozen food portions is being effected. The panel 28 may also include a thermometer 37 which indicates the temperature of the heating spaces 14 of the oven and a clock or timer 38 having indicia to indicate the length of time of a thawing period of frozen food portions and the part of the thawing period that has elapsed.

It is desirable to thaw a plurality of frozen food portions in the shortest time possible. It has been found that frozen food portions or packages of a size normally encountered can be thawed and prepared in about 20 to 30 minutes at an operating temperature of about 180° C., for example. If the heating oven is maintained at such an operating temperature before treatment of a plurality of frozen food portions is started or between successive treatments of frozen food portions, the temperature in the heating oven is lowered substantially when the frozen food portions are introduced into the oven and the operating results will be unsatisfactory and non-uniform.

The unsatisfactory operation of the heating oven may be due to the fact that the doors of the heating oven remain in their open position for a variable interval of time when the frozen food portions are being introduced into the oven. When a great number of frozen food portions at a low temperature of about —20° to —25° C., for example, are introduced into the heating oven at the same time, this results in a pronounced reduction in the temperature of the oven.

In accordance with this invention, the disadvantages referred to above are effectively overcome and satisfactory operation of the heating oven for thawing and preparing frozen food portions is insured by preheating the oven to a first elevated temperature, which is higher than a second normal operating temperature, before the frozen food portions are introduced into the oven to make the oven or heating space ready for thawing and heating the frozen food portions. The power or ability of a heating oven to store heat determines the readiness temperature which, in a heating oven like the oven 10 described above and shown in FIGS. 1 to 5, may be about 230° C., for example.

FIG. 7 diagrammatically represents an electric circuit operable to preheat the heating oven 10 to a desired readiness temperature, the control panel 28 being indicated by dot and dash lines. The conductors 29 are connected to the main control switch 30 from which electrical energy is conducted to the electrical heating elements 18 through the conductors 32 in which a relay 40 is connected. A zero potential conductor 39 is associated with the conductors 29 and 32.

The circuit for the fan motor 16 is completed from the conductors 29 through conductors 41, a relay 43 and the conductors 31. Electrical energy is tapped from one of the conductors 41 to one contact 44 of a switch S–1 through conductors 45 and 47. The switch S–1 includes the operating member 35 which is biased by a spring 48 to a circuit open position and provided on the panel 28, as shown in FIG. 6. The contact 44 is connected by a conductor 49 to a contact 50 of a switch S–2 provided with the operating member 33 which is also positioned on the panel 28, as shown in FIG. 6. The operating member 33 is movable between a first preheating position shown in FIG. 7 and a second thawing position shown in FIG. 8 and is adapted to be held or locked in either position in any suitable manner (not shown).

Under certain operating conditions, a circuit is completed from conductor 49 to a region 51 of the zero-potential conductor 39 associated with the conductors 29 and 32 for supplying electrical energy to the heating elements 18. This circuit includes a movable member 52 of switch S–2, conductor 53, contact 46 of switch S–1, conductor 54, thermostatic switch 55, coil 56 of the relay 43, and conductors 57, 58 and 59 which, as just explained is connected at 51 to the zero-potential conductor 39. When the coil 56 of the relay 43 is energized, a circuit will be completed for supplying electrical energy to the fan motor 16.

A conductor 60 is connected to one of the contacts of the relay 43 and is connected to the source of electrical energy when relay 43 becomes energized. The conductor 60 is connected to one terminal of a thermostat 61, the other terminal of which is connected by a conductor 62 to a coil 63 of the relay 40. The thermostat 61 includes a thermal sensitive element 64 which is arranged to be responsive to a temperature condition affected by the heating elements 18. As shown in FIG. 2, the thermal sensitive element 64 may be located in the air delivery channel 19 between the heating element 18 and one of the heating spaces 14. By way of example and without limitation, the thermostat 61 may be adjusted to open the circuit in which it is connected when the temperature of the heating spaces 14 reaches an elevated temperature of about 180° C.

A second thermostat 65 is connected in parallel with the thermostat 61 by a circuit which includes a conductor 66, movable member 67 of switch S–2, conductor 68, the thermostat 65 and conductor 69. The second thermostat 65 includes a thermal sensitive element 70 which also is arranged to be responsive to a temperature condition affected by the heating elements 18. As seen in FIG. 2, the thermal sensitive element 70 desirably is located adjacent to the thermal sensitive element 64 and the thermostat 65 is adjusted to open the circuit in which it is connected when the temperature of the heating spaces 14 reaches a readiness temperature of about 230° C., for example.

The pilot lamp 34 is connected in a circuit which becomes energized when conductor 59 is connected to a source of electrical energy. As shown in FIG. 7, the circuit for the pilot lamp 34 includes conductor 71, movable member 72 of the relay 40, conductor 73, the pilot lamp 34, and conductors 74, 58 and 59, the latter being connected at 51 to the potential conductor 39.

When operation of the heating oven 10 is started, the switch operating member 33 of switch S–2 is moved to its first preheating position shown in FIG. 7 and locked in this position, as explained above. This completes electrical circuits for the coils 56 and 63 of the relays 43 and 40, respectively, which become energized to complete electrical circuits for the fan motor 16 and the heating elements 18. Since the thermostats 61 and 65 are connected in parallel, the heating effected by the heating elements 18 will not be interrupted before the circuit of the second thermostat 65 opens when the heating spaces 14 reach the readiness temperature of about 230° C., for example. When this occurs, the thermostat 65 functions to open the circuit of the coil 63 of the relay 40 and the latter opens and becomes deenergized to disconnect the heating elements 18 from the source of electrical supply. When the relay 40 becomes deenergized, the movable member 72 is raised and opens the circuit for the pilot lamp 34 which is extinguished.

However, the fan motor 16 remains connected to the source of electrical supply and, in the event the heating oven 10 is not used at this time, the thermostat 65 will function to control the supply of electrical energy to the heating elements 18 to maintain the heating spaces at the readiness temperature.

As shown in FIG. 7, a clock switch unit 75, the clock face 38 of which is diagrammatically shown on the panel 28 in FIG. 6, is provided with two switches 77 and 78 and arranged to be driven by a motor 76. The switch 78 controls the operation of the motor 76 and is connected by a conductor 79 to contact 44 of switch S–1 to which is also connected the conductor 47. When heating of the oven 10 is being effected, the switches 77 and 78 are in the positions illustrated in FIG. 7 and the position of the switch arm 92 of the switch 78 diagrammatically represents that this switch is open. Under these conditions, the motor 76 is deenergized and the clock switch unit 75 is rendered inoperable.

When thawing of frozen food portions is to be effected in the heating spaces 14, the switch operating member 33 is moved to its second thawing position illustrated in FIG. 8. The doors 15 are opened momentarily to introduce into the heating spaces 14 the frame units 26 upon the shelves 24 of which are positioned the frozen food portions 23, and the doors are then immediately closed. The switch operating member 35 is moved against the biasing action of the spring 48 to close the switch S–1 and then released. During the short interval of time the switch S–1 is closed, a circuit is completed for the coil 56 of the relay 43. This circuit includes the conductor 47, contacts 44 and 46 of the switch S–1, conductor 54, thermostatic switch 55, coil 56, and conductors 57, 58 and 59 to the connection at 51 to the zero potential conductor 39. When the coil 56 is energized the relay 43 is closed and a circuit is completed for the fan motor 16.

When the operating member 33 is shifted from its first preheating position in FIG. 7 to its second thawing position in FIG. 8, the movable member 67 of the switch S–2 no longer bridges conductors 66 and 68 and the circuit for the second thermostat 65 is broken. In this way the second thermostat 65 is rendered ineffective and the heating elements 18 are controlled responsive to the first thermostat 61 which is adjusted to maintain the heating spaces 14 at a temperature of about 180° C., for example, which is lower than the readiness temperature.

A holding circuit is completed for the relay 43 when the operating member 33 of the switch S–2 is in its second thawing position in FIG. 8 and the operating member 35 of the switch S–1 is momentarily moved to its closed position. This circuit includes the conductors 47, 49 and 80, movable member 52 of the switch S–2, conductor 81, movable member 82 of the relay 43, conductors 83 and 84, switch 77 which forms a part of the clock switch unit 75 and is a closed position, conductor 85, contact 86, movable member 67 of the switch S–2, conductors 53 and 54, thermoplastic switch 55, coil 56 of the relay 43, and conductors 57, 58 and 59 to the region 51 of the zero potential conductor 39. When this holding circuit for the relay 43 is completed, a circuit is completed for the pilot lamp 26. This circuit includes conductor 87 which is connected to the conductor 85 at contact 86, the pilot lamp 36, and conductors 88, 74, 58 and 59 to the region 51 of conductor 39 at zero potential.

In FIG. 8 it will be seen that conductor 83 is connected by a conductor 89 to one terminal 90 of the switch 78 which is connected by a conductor 91 to the motor 76 for driving the clock switch unit 75. The circuit for the motor 76 is completed by the conductors 74, 58 and 59 to the region 51 of the conductor 39 at zero potential.

While thawing of the frozen food portions 23 is being effected, the thermostat 61 controls the operation of the heating elements 18 to maintain the heating spaces 14 at a temperature of about 180° C., for example. With the motor 76 energized in the manner just explained, it is operable to drive the clock switch unit 75. The clock switch unit 75 can be adjusted to keep the switch 77 closed for a given interval of time while thawing of the frozen food portions 23 is being effected. During the thawing period, both the pilot lamps 34 and 36 are energized. However, the pilot lamp 34 will be energized only when the relay 40 is closed and electrical energy is being supplied to the electrical heating elements 18.

After the given interval of time has elapsed the switch 77 opens and breaks the circuits for the coil 56 of the relay 43 and the thermostat 61. This opens both the relays 40 and 43 and disconnects the heating elements 18 and fan motor 16 from the solurce of electrical supply to terminate thawing of the frozen food portions 23 which are then removed from the heating oven 10 and ready to be served.

When the relays 40 and 43 open, the circuit for the clock motor 76 through the conductor 89 will be broken. However, after the given interval of time for which the clock switch unit 75 has been adjusted, the arm 92 of the switch 78 will move from its open position in FIG. 7 to its closed position in FIG. 8 and an alternative circuit will be completed for the motor 76. This alternative circuit includes conductors 47 and 79, switch arm 92, conductor 91, motor 76, and conductors 74, 58 and 59 to the region 51 of conductor 39 at zero potential. The motor 76 will remain energized until the switch clock unit 75 is returned to its starting or zero position at which time the switch arm 92 moves to its open position to open the circuit for the motor 76 and an arm 93 of the switch 77 moves to its closed position, as diagrammatically shown in FIG. 7. In this way the switch 76 of the clock switch unit 75 will be ready to complete a holding circuit for the coil 56 of the relay 43 the next time a thawing period is started responsive to movement of the operating member 33 of switch S–2 to its second thawing position shown in FIG. 8. However, at the conclusion of a thawing period the operating member 33 is moved to its first heating position shown in FIG. 7 to place the heating oven 10 in readiness to effect heating of frozen food portions at an elevated temperature which is higher than the temperature at which thawing is effected.

Modifications of the embodiment of the invention which has been described and illustrated will occur to those skilled in the art, so that it is desired not to be limited to the particular arrangement set forth. Therefore, it is intended in the claims to cover all those modifications and features which do not depart from the spirit and scope of the invention.

What is claimed is:

1. Apparatus of the class described for thawing and heating to a definite elevated temperature at the same time like portions of frozen food held in receptacles having, in combination, (a) structure defining an upright heating space having opposing side walls respectively formed with air inlet and air outlet openings, (b) conduit means including said heating space for circulating air across said space from the air inlet openings to the air outlet openings, (c) heating means in said conduit means outside said space for heating the air circulated through said space to heat the latter, (d) means for stacking a plurality of receptacles one above another in vertically spaced relation in said space in a single body of air therein, (e) said structure including means for forcibly circulating a plurality of streams of air across said space from the air inlet openings to the air outlet openings in horizontal paths of flow which are contiguous to and in physical contact with one another with (1) the air streams flowing at the same speed and only once past the receptacles in said space and (2) with each air stream only flowing past the receptacles in its particular path of flow, (f) control means (1) for controlling said heating means to preheat said space to a first high elevated temperature to make said space ready for thawing and heating the frozen food portions held in the receptacles before the latter are inserted into said space and (2) for subsequently controlling said heating means to heat said space to a second lower temperature after the frozen food portions held in the receptacles are inserted into said space when the latter has been preheated to the first high elevated temperature, (g) said control means comprising an electric circuit having a switch movable between first and second positions and first and second thermostats connected in parallel, said second thermostat being operable in the first position of said switch and inoperable in the second position of said switch, said first thermostat functioning to control said heating means to render the latter operable to heat said space to the second lower elevated temperature in the second position of said switch and said second thermostat functioning to control said heating means to render the latter operable to heat said space to the first high elevated temperature in the first position of said switch, (h) said control means, responsive to functioning of said second thermostat, rendering said heating means operable to supply a definite quantity of heat to said space and store such heat therein to preheat said space to (1) increase the temperatures of the frozen food in the receptacles inserted into said space to 0° C. when said space is preheated to the first high elevated temperature and also (2) effect thawing of the portions of frozen food in the receptacles substantially at 0° C., (i) said heating means comprising an electric heater, (j) said means for circulating the plurality of air streams forcibly across said space comprising an electric motor and a fan driven by said motor, (k) means including a first relay in said circuit operable to energize and deenergize said motor, (l) means comprising a second relay in said circuit operable to energize and deenergize said electric heater, and (m) means comprising said first relay when the latter is operable to energize said electric motor to render said second relay operable to energize said electric heater.

2. Apparatus as set forth in claim 1 in which said switch movable between first and second positions constitutes a first switch, said circuit including a second switch biased to an open position and movable to a closed position against said bias, means responsive to movement of said second switch to its closed position to momentarily render said first relay operable to energize said electric motor, means also responsive to movement of said second switch to its closed position, when said first switch is in its second position, to provide a holding circuit for said first relay to render the latter operable to energize said motor when said second switch moves to its biased open position, said last-mentioned means including a clock switch unit which, after an interval of time, renders said first relay operable to deenergize said electric motor, and said second relay becoming inoperable to energize said electric heater when said first relay becomes operable to deenergize said electric motor.

3. Apparatus as set forth in claim 2 in which said circuit includes a pilot lamp, said circuit including means for energizing said last-mentioned pilot lamp during the interval of time when said first and second relays are rendered operable to energize said motor and said electric heater, respectively, by said clock switch unit.

4. Apparatus as set forth in claim 2 in which said clock switch unit is movable from a starting position to clock said interval of time, and said circuit including means which becomes operable at the end of said interval of time to return said clock switch unit to its starting position.

References Cited

UNITED STATES PATENTS

| | | | |
|---|---|---|---|
| 2,862,096 | 11/1958 | Gordon | 219—400 |
| 2,906,620 | 9/1959 | Jung | 219—400 X |
| 3,032,636 | 5/1962 | Schaver | 219—413 X |
| 3,214,569 | 10/1965 | Carson | 219—413 X |
| 3,221,729 | 12/1965 | Beasley et al. | 219—400 X |
| 3,261,343 | 7/1966 | Tibell | 126—21 |
| 3,265,861 | 8/1966 | Perlman | 219—399 |

FOREIGN PATENTS

| | | |
|---|---|---|
| 1,198,612 | 6/1959 | France. |

RICHARD M. WOOD, *Primary Examiner.*

C. L. ALBRITTON, *Assistant Examiner.*